US012569400B2

(12) United States Patent
Brennan

(10) Patent No.: US 12,569,400 B2
(45) Date of Patent: Mar. 10, 2026

(54) MULTIDIRECTIONAL HYDROTHERAPY TUB COPLANAR FLOW

(71) Applicant: SARATOGA SPA & BATH, INC., Latham, NY (US)

(72) Inventor: Anthony Brennan, Latham, NY (US)

(73) Assignee: SARATOGA SPA & BATH, INC., Latham, NY (US)

( * ) Notice: Subject to any disclaimer, the term of this patent is extended or adjusted under 35 U.S.C. 154(b) by 989 days.

(21) Appl. No.: 17/584,746

(22) Filed: Jan. 26, 2022

(65) Prior Publication Data

US 2023/0233405 A1 Jul. 27, 2023

(51) Int. Cl.
*A61H 33/00* (2006.01)

(52) U.S. Cl.
CPC ..... *A61H 33/6052* (2013.01); *A61H 33/6005* (2013.01); *A61H 33/6063* (2013.01)

(58) Field of Classification Search
CPC .................................................. A61H 33/6052
See application file for complete search history.

(56) References Cited

U.S. PATENT DOCUMENTS

| | | | | |
|---|---|---|---|---|
| 4,953,240 | A | 9/1990 | Gardenier | |
| 6,351,859 | B1 * | 3/2002 | Maiuccoro | A61H 33/027 239/432 |
| 6,643,859 | B1 * | 11/2003 | Brennan | A61H 33/6063 4/541.4 |
| 6,760,932 | B1 * | 7/2004 | Maiuccoro | A61H 33/027 4/541.4 |
| 8,177,141 | B2 * | 5/2012 | Hagaman | F21S 8/00 239/18 |
| 2014/0101840 | A1 * | 4/2014 | Harder | A61H 33/6063 4/541.6 |
| 2017/0239138 | A1 * | 8/2017 | Afshar | A61H 33/6063 |

* cited by examiner

*Primary Examiner* — Christine J Skubinna
(74) *Attorney, Agent, or Firm* — Heslin Rothenberg Farley & Mesiti P.C.

(57) ABSTRACT

A hydrotherapy tub coplanar flow device includes a body mounted onto an inner surface of the hydrotherapy tub. The body includes at least one set of oppositely faced coplanar flow nozzles allowing coplanar flow to occur in opposite directions from the device. The device includes a hollow internal channel therein extending continually from a first slotted nozzle at one end of the body to a second slotted nozzle at a second end of the body that water from a water supply inlet can flow in both directions within the hollow channel towards both slotted nozzles.

24 Claims, 12 Drawing Sheets

MULTIDIRECTIONAL HYDROTHERAPY TUB COPLANAR FLOW

TECHNICAL FIELD

This invention relates, in general, to hydrotherapy tubs and, in particular, to coplanar flow nozzles usable for creating planar fluid flow in hydrotherapy tubs.

BACKGROUND ART

Hydrotherapy tubs generally have a number of fluid flow outlets or nozzles. Each flow nozzle usually jets water or a water-air froth into the tub. Enhanced hydrotherapy typically results from strategic positioning of these fluid flow nozzles at various locations in the tub.

One design delivers water to a fixed rectangular spout and subsequently through a wider rectangular outlet for mixing with air and coplanar expulsion along the tub inner surface. An air jacket or shell, extending over the rectangular spout and forming the subsequent outlet, uses the pressure drop caused by the spouted water to draw in the atmospheric air along a path above the water line from a rearward opening within the shell. Such a configuration is disclosed in U.S. Pat. No. 4,953,240 to Gardenier. However, in this coplanar nozzle, there is no separate or isolated conduit for supplying air from underneath the tub surface. Therefore, this type of coplanar-flow nozzle cannot be positioned below the tub water line to produce an air-water mixture or froth. In addition, it remains desirable to provide improvements for the air and/or water flow provided by this type of coplanar-flow nozzle, to enhance the resultant air-water mixture, efficiency, and/or hydrotherapeutic effectiveness.

In another design, hydrotherapy-tub coplanar-flow device includes slotted nozzle on a body for discharge of fluids from the nozzle in a substantially coplanar flow. The body is adapted for mounting on an inner surface of a hydrotherapy tub and attachable to first and second fluid supply conduits. Further, the body has a first inlet for flow of water from the first fluid supply conduit and a second inlet for flow of air from the second fluid supply conduit. The slotted nozzle discharges these fluids in the substantially coplanar flow. The second inlet of the body is located between the first inlet and the slotted nozzle. The body includes an air dam located between the inlets, such as an interior face portion having a steep decline toward the second inlet of the body. Such a design is shown in U.S. Pat. No. 6,351,859 to Maiuccoro. However, in this design, each coplanar flow nozzle has its own separate dedicated hollow interior channel. Thus, the more flow nozzles used, the greater the pressure drop and the greater the reduction in flow velocity of fluid exiting the nozzle. Thus, higher pressure and/or flow rate pumps may be required. In addition, this design utilizes multiples holes within a hydrotherapy tub to connect the various fluid streams.

Thus, a need exists for a hydrotherapy tub and a coplanar nozzle therefor having multiple coplanar flow nozzles with improved delivery of multiple fluids so that coplanar flow of an air-water froth may occur below the water line without significant pressure drop or significant reduction in flow rate. A further need exists for creating a coplanar flow device which allows water to flow from a single opening into a hollow flow channel having multiple coplanar flow nozzles which may be faced in opposite directions. Additionally, a need exists for allowing the coplanar flow nozzles to conform to various shaped to accommodate variations in hydrotherapy tub surfaces. Also, a need exists for a coplanar nozzle forming a water flow path which enhances efficiency and/or effectiveness in drawing air flow to produce a hydrotherapeutic air-water mixture, so that no external pressure source such as a pump is needed to pump air for mixture with water to create a froth. Also, a need exists for a coplanar flow device which allows multiple fluids to be transmitted to the device via multiple supply conduits through a single hole or aperture in a hydrotherapy tub surface. Finally, a need exists for an elongated coplanar flow device which allows coplanar flow in opposite directions.

SUMMARY OF THE INVENTION

The shortcomings of the prior art are overcome and additional advantages are provided through an improved hydrotherapy-tub coplanar-flow device. The device is mounted on an inner surface of a hydrotherapy tub. Through a slotted nozzle, the fluid is discharged in a substantially coplanar flow on the inner surface of the hydrotherapy tub. The hydrotherapy tub coplanar flow device includes a body adapted for mounting on an inner surface of a hydrotherapy tub. A hollow internal channel is located within the body extending continually from a first slotted nozzle at a first end of the body to a second slotted nozzle at a second end of the body. The first slotted nozzle and the second slotted nozzle are coplanar with a portion of the internal channel. A first fluid supply conduit is fluidly connected to the internal channel via an opening leading exclusively into the internal channel to allow water to flow from the first fluid supply conduit through the opening and exclusively into the internal channel where the water is allowed to flow into the internal channel and through both the first slotted nozzle and the second slotted nozzle. A second fluid supply conduit is located between the first slotted nozzle and the first fluid supply conduit to allow air to flow into the internal channel between the first slotted nozzle and the first fluid supply conduits. A first interior dam is located within the internal channel between the first fluid supply conduit and the second fluid supply conduit. The first interior dam forms a reduced cross sectional flow area for water in the interior channel relative to a flow area of water through the first inlet. A third fluid supply conduit is located between the first fluid supply conduit and the second slotted nozzle to allow air to flow into the internal channel between the second slotted nozzle and the first fluid supply conduit. A second interior dam is located within the internal channel between the first fluid supply conduit and the third fluid supply conduit. The second interior dam forms a reduced cross sectional flow area for water in the interior channel relative to a flow area of water through the first inlet.

The device is configured to be mounted onto a surface of a hydrotherapy tub to produce first and second coplanar flow streams from the first slotted nozzle and the second slotted nozzle, respectively. The coplanar flow streams are coplanar on one or more surfaces of said hydrotherapy tub. The height of a slot of the first slotted nozzle or second slotted nozzle may be similar to a height of the hollow internal channel. The first and second slotted nozzles face in opposite coplanar directions and/or may face away from each other at an angle less than 180°. The first or second slotted nozzle may be curved relative to the hollow internal channel. The first or second slotted nozzle may be formed of a flexible material capable of conforming to a shape of the surface of the hydrotherapy tub.

The first interior dam and second interior dam are configured to cause water from the first fluid supply conduit to flow over the second fluid supply conduit and the third fluid supply conduit to draw air from the second fluid supply conduit and the third fluid supply conduit to create a water and air froth which exits the first slotted nozzle and the second slotted nozzle. The first interior dam may form a steep decline toward an opening between the second fluid supply conduit and the hollow interior channel. The dam may form at least one abrupt step.

The fluid supply conduits may include a water supply conduit and at least a pair of air supply conduits. A threaded cylinder may extend from the body of the coplanar flow device. The fluid supply conduits extend from the body and are located within the interior of the threaded cylinder. Also, the length of the fluid supply conduits may be longer than the length of the threaded cylinder so the ends of the fluid supply conduits are not within, but extend below, the threaded cylinder. Hoses to supply fluid including air and water may be affixed to the ends of fluid supply conduits without the ends being located within the threaded cylinder. The air supply conduits may be larger than the water supply conduit. And, the water supply conduit may be longer in diameter than the air supply conduit. A threaded nut may be threadably engageable with the threaded cylinder to affix the body of the coplanar flow device to a tub surface.

In another embodiment, a hydrotherapy tub includes a body mounted on an inner surface of a hydrotherapy tub. The body includes a hollow internal channel within the body extending continually from a first slotted nozzle at a first end of the body to a second slotted nozzle at a second end of the body. The first slotted nozzle and the second slotted nozzle are coplanar with a portion the internal channel. A first fluid supply conduit is fluidly connected to the internal channel via an opening leading exclusively into the internal channel to allow water to flow from the first fluid supply conduit through the opening and exclusively into the internal channel via a flow path where the water is allowed to flow into the internal channel and through both said first slotted nozzle and the second slotted nozzle. A second fluid supply conduit is located between the first slotted nozzle and the first fluid supply conduit to allow air to flow into the internal channel between the first slotted nozzle and the first fluid supply conduit. A first interior dam is located within the internal channel between the first fluid supply conduit and the second fluid supply conduit. The first interior dam forms a reduced cross sectional flow area for water in the interior channel relative to a flow area of water through the first inlet. A third fluid supply conduit is located between the first fluid supply conduit and the second slotted nozzle to allow air to flow into the internal channel between the second slotted nozzle and the first fluid supply conduit. A second interior dam is located within the internal channel between the first fluid supply conduit and the third fluid supply conduit. The second interior dam forms a reduced cross sectional flow area for water in the interior channel relative to a flow area of water through said first inlet.

Additional features and advantages are realized through the structures and techniques of the present invention. Other embodiments and aspects of the invention are described in detail herein.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description of preferred embodiments taken in conjunction with the accompanying drawings, where like or identical structures are indicated with like reference in which:

DESCRIPTION OF THE PREFERRED EMBODIMENTS

In accordance with the principles of the present invention, coplanar flow capability is provided for a hydrotherapy-tub by using a coplanar-flow device in which water and air flow into a single hollow interior channel for discharge from at least two nozzles in a substantially coplanar flow from each nozzle, as described below.

Figure 1:
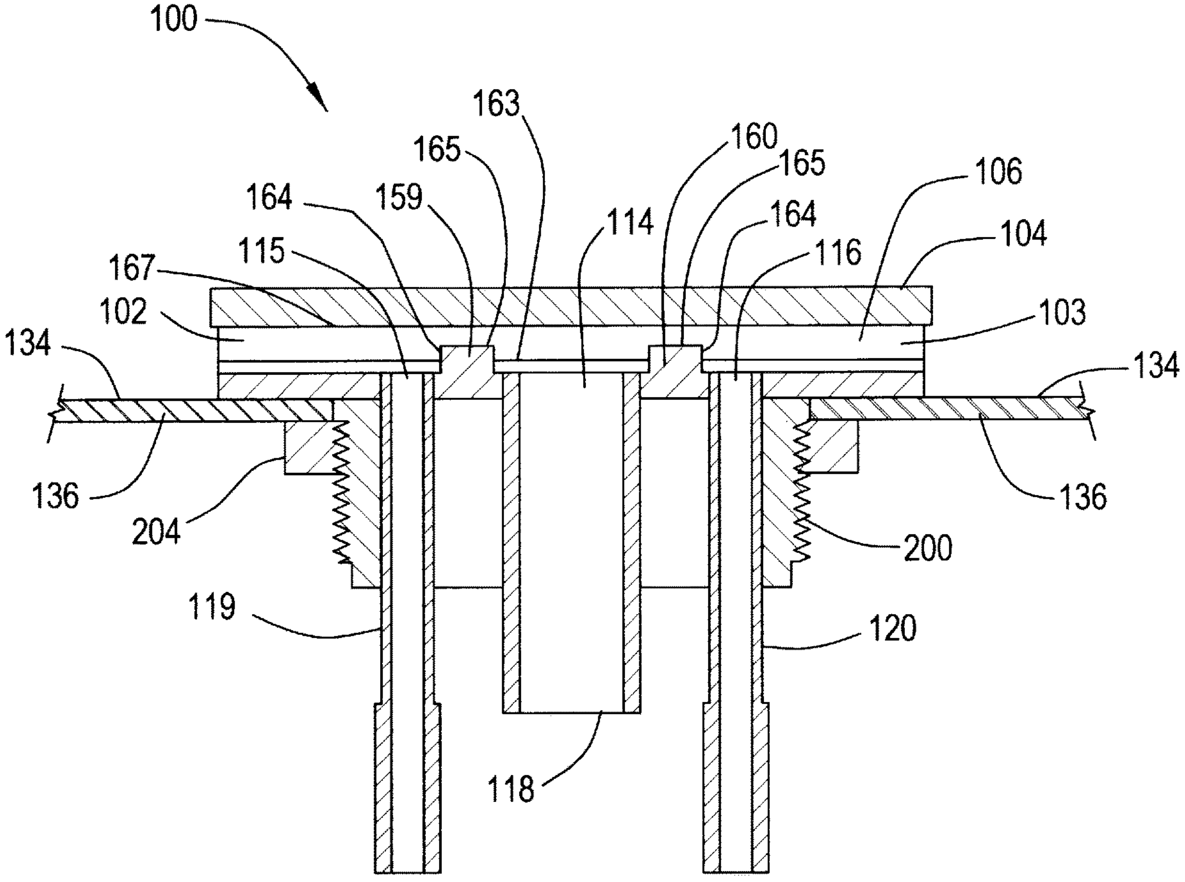
FIG. 1 is a side sectional view of one example of a hydrotherapy-tub coplanar-flow device producing substantially coplanar flow in accordance with the principles of the present invention and mounted within a hydrotherapy tub.

One example of a hydrotherapy-tub coplanar-flow device incorporating and using the novel features of the present invention is depicted in FIG. 1 and described in detail herein. In this exemplary embodiment, a coplanar flow device 100 may be mounted onto a hydrotherapy tub 136 so that a first slotted outlet or nozzle 102 on body 104 and a second slotted outlet 103 or nozzle on the same body are exposed to the interior of the tub. The coplanar flow device is oriented so that the nozzles allow a water and air mixture (e.g., froth) to flow substantially coplanar from the slotted nozzles in different directions along an inner surface 134 of the hydrotherapy tub.

First slotted nozzle 102 and second slotted nozzle 103 are in fluid flow communication with a single hollow flow channel 106 which is an interior channel. Through openings 114, 115 and 116 in the body 104 fluids (e.g., water and air) from the fluid supply conduits 118, 119 and 120 flow exclusively into the single hollow channel 106. For example, water from fluid supply conduit 118 enters into opening 114 and flows into only a single interior flow channel 106 where it can flow to either nozzle 102 or 103. Further, air from fluid supply conduits 119 and 120 may enter into openings 115 and 116, respectively and flow into flow channel 106. The water from fluid supply conduit 118 in flow channel 106 and air from openings 115, 116 are mixed in the hollow interior in flow channel 108 and ejected out of the first slotted nozzle 102 and second slotted nozzle 103, which both flow in coplanar flow in relative directions over inner surface 134 of hydrotherapy tub 136. The water and air from fluid supply conduits 118, 119 and 120 flows in the single interior hollow flow channel 106, and not into multiple interior flow channels.

Preferably, hollow flow channel 106 contains water delivered through fluid supply conduit 118 under pressure. The water flow transition from fluid supply conduit 118, through opening 104, and into flow channel 106 for eventual discharge from nozzles 102 and 103 may advantageously serve to promote air delivery from fluid supply conduits 119 and 120 and into substantially coplanar flows. A decreased cross-sectional area for flow of the pressurized water formed by dams 159 and 160 yields increased flow velocity of the water as it passes openings 115 and 116 for inlet 112, which introduces air into body 104. This increased stream velocity of the water allows air at opening 116 to be drawn therethrough from conduits 119 and 120 to form the substantially coplanar flow. In addition, the drawing of air is promoted by a separation distance between the pressurized water, and the openings 115 and 116, whose air flow is advantageously influenced and/or promoted by the presence of an air dam which may be formed from (protuberances 159 and 160 on lower interior face portion 163 of the body of the device, as described herein. With such a configuration, a sufficient mixture of water and air may be created so that the coplanar flow of the froth is strong enough to provide sufficient hydrotherapy effects in multiple directions, without the use of air pumps for the air.

Further, air may be desirably delivered to the body 104 of the device from below the water line. By designing device 100 to increase the water velocity for drawing air through openings 116, fluid supply conduits 119 and 120 may extend below the water line to, for instance, an atmospheric air source having any desired location. For example, the air source could be a valve or hole exposed to the atmosphere from any desired location on hydrotherapy tub 136, whether above or below a given water line. The valve would allow the user to selectively control the amount of air finally ejected from the slotted nozzles 102 and 103 into substantially coplanar flow, for improved hydrotherapy.

In one example, the interior face portion 163 of body 104 of the device includes the air dams 159 and 160, which enhance fluid flow, pressure, and/or dynamics, as can be appreciated through examination of FIGS. 1-4 in conjunction with the description herein. For instance, the air dams 159 and 160 may be formed with protuberances (e.g., a step, stop, and/or other structure which creates a reduction of the cross-sectional area through which flows the water) that may include a steep decline 164, for example, facing and/or leading toward openings 115 and 116. The steep decline may comprise an abrupt transition from a land 165 of each protuberance, toward the face portion. For example, the abrupt transition may occur between the land 165 and a region 166 of the interior face portion 163, with the region located between each protuberance and the inlet 112. Such a configuration may advantageously cause flow of water from fluid supply conduit 118, to have a separation distance over the inlet 112, for example, to promote drawing of air from the inlet 112 to create substantially coplanar flow.

As will be understood by those skilled in the art, body 104 with protuberances 159 and 160, formed as air dams, may be configured to cause flow of water from fluid supply conduit 118 to form low pressure areas between openings 115 and 116 and the water flowing thereabove from fluid supply conduit 118. That is, the steep declines 164 may serve to cause the flow of water from the fluid supply conduit 118 to have the separation distance over the openings 115 and 116, to form the low pressure over and/or about the openings, and/or the region of the interior face portion 163. This low pressure may advantageously serve to allow air to leave a relatively higher pressure area in fluid supply conduits 119 and 120, and enter the flow channel 108 in body 104. This region and/or protuberances 159 may have any desired size and/or configuration. For example, it may be desirable to increase or decrease the size of the region 166 and/or protuberance 159, to suit and/or achieve certain flow characteristics and/or mixture composition, such as by increasing and/or decreasing the volume and/or extent between flow channel 106 and openings 115 and 116 (e.g., a section of the flow channel 108).

Body 104 may be formed, for instance, so that the ratio of the cross-sectional flow area at the location where the water supply conduit 118 enters the channel 106 to the total cross-sectional flow area over each air dams 159 is approximately 1.7 or higher. The cross-sectional area of the water supply conduit 118 where the water enters the hollow interior channel 106 may be a passage area (e.g., a circle characterized by an inner diameter) of conduit 118. The cross-sectional area of the available flow area over each air dam may be defined by the product of the distance from protuberance 159 (e.g., land 165) to an opposing interior face portion 167, and the length (e.g., or average length) of sides 105, 107 (see FIG. 2).

One or more benefits, features, advantages, constructions, and/or enhancements analogous to those described herein with reference to protuberances 159 and 160 (e.g., for device 100, FIGS. 1-3) may be provided using multiple protuberances, each between water supply conduit 118 and a respective air supply conduit 119, 120, as will be appreciated by those skilled in the art. Moreover, any appropriate relative location among various components and/or foil cations (e.g., supply conduits 118, 119, 120, protuberances 159, 160 and/or nozzles 102 and 103), may be selected and/or formed for a particular device of the invention. Further, the device may have any number, type, and/or combination of protuberances.

Again referring to FIG. 1, in addition to steep decline 164, each protuberances 159, 160 may include an abrupt step or steep transition (e.g., incline) 164 from a region on the interior face 163 to the land 165 of the protuberance. That is, the steep transition 168 and the region may be located between the protuberance 159 and air supply conduit. In guiding and/or directing flow of water from the inlet 110 to have the separation distance conduits 119, 120 at termination of the protuberance, the steep transition 168 at initiation of the protuberance may, for instance, desirably cause a high pressure over and/or above the region. Various aspects of the invention related to such flow features, system dynamics, and/or hydrodynamics, will be appreciated by those skilled in the art.

Referring still to FIG. 1, in one embodiment of device 100 for hydrotherapy tub 136, water may be pressurized and air may flow from atmosphere pressure so as to be mixed within coplanar flow device 100 for ejection out of nozzles 102, 103. In another embodiment, both water in fluid supply conduit 118 and also air in fluid supply conduits 119, 120 may be supplied under pressure. Additional description of exemplary air and water flow is presented further below.

Figure 2:
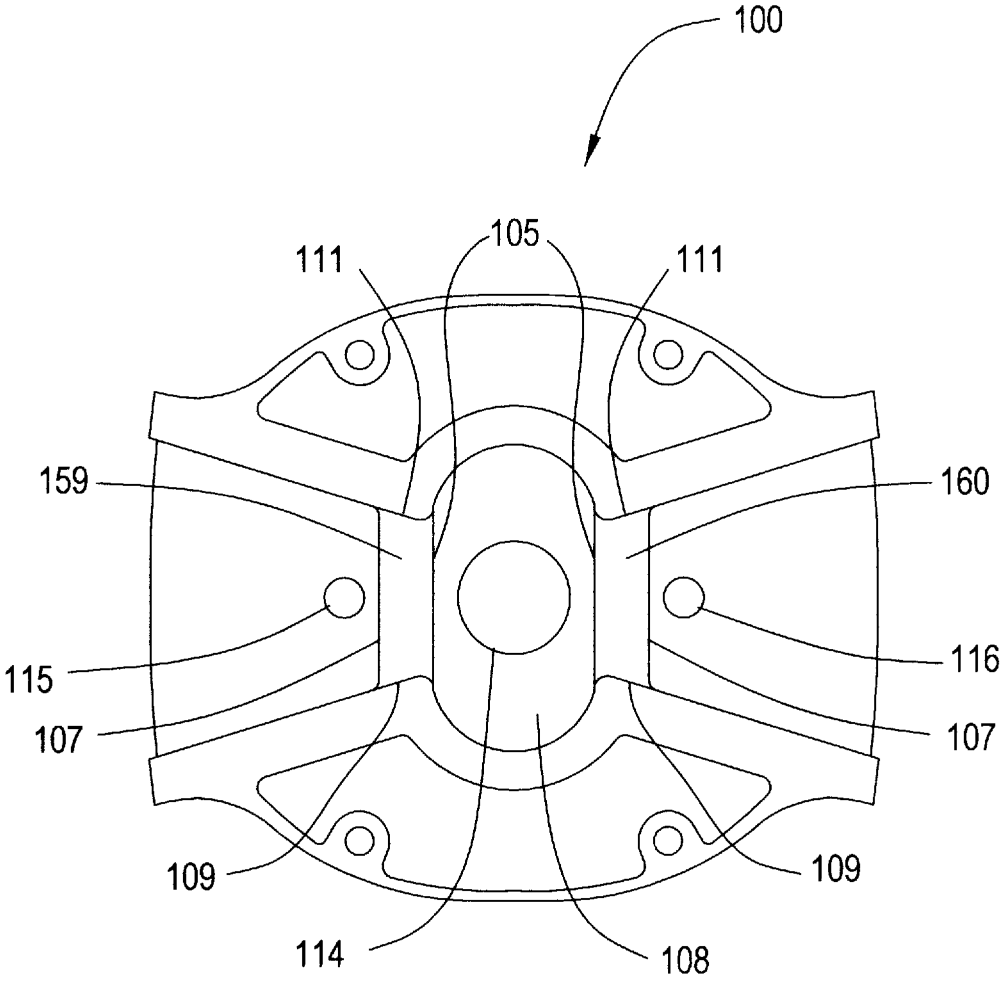
FIG. 2 is a top, sectional, cutaway view of the hydrotherapy-tub coplanar-flow device shown in FIG. 1 and in accordance with the principles of the present invention.

For illustrative purposes, the following exemplary dimensions for device 100 are presented. Referring to FIG. 1, opening 114 may have an inner diameter in the approximate range of 13-15 mm. where the openings 115, 116 of the air supply conduits into the channel 106 may have an inner diameter in the approximate range of 4-6 a m. Referring to FIG. 2, sides 105 of air dams 159, 160 may have a length in the approximate range 20-22 mm. Side 107 of the air dam may have a length in the approximate range 22-24 mm. Sides 109, 111 may each have a width in the approximate range 6-8 mm. Again referring to FIG. 1, body 104 may have a distance from the center of the inlet 110 to steep transition 168 of the air dam, in the approximate range 9-11 mm. The body may have a distance from the center of the opening 114 to the steep decline 164 of each air dam, in the approximate range 4-6 mm.

Figure 3A:
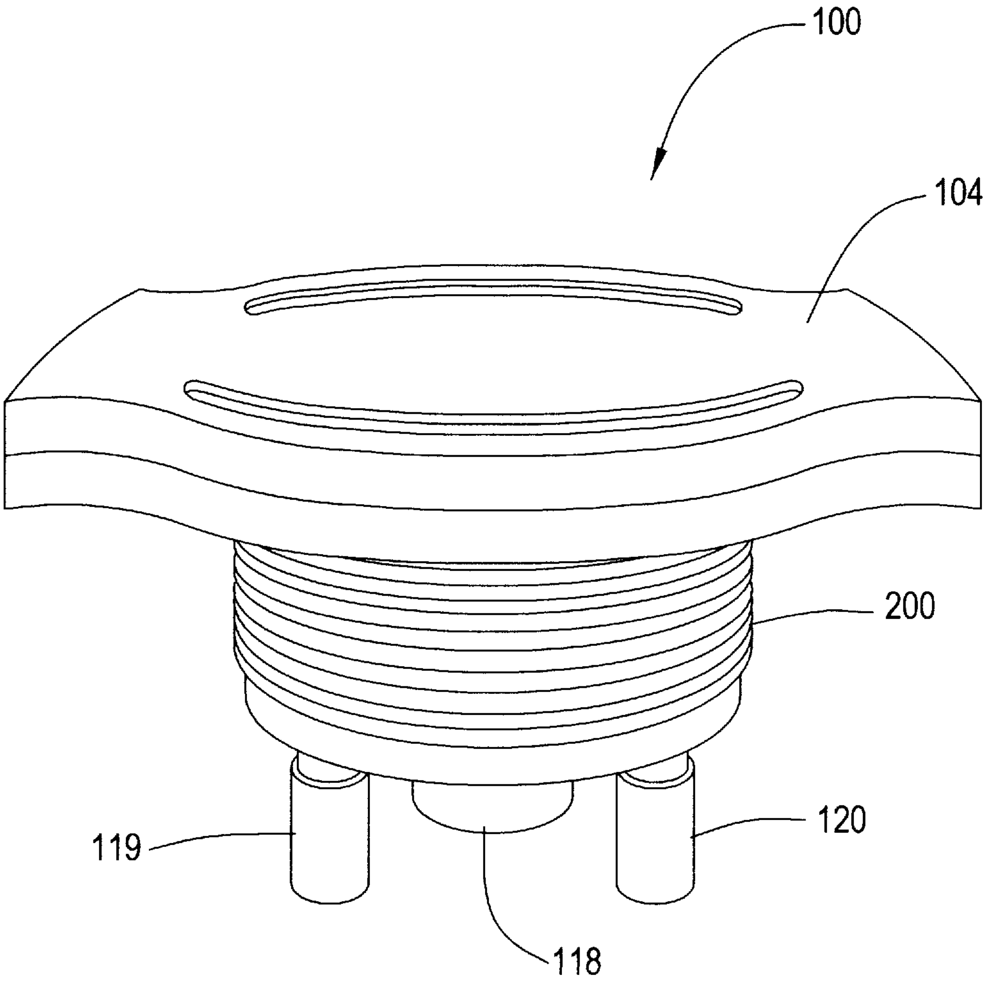
FIG. 3A is an isometric view of the hydrotherapy-tub coplanar-flow device of FIGS. 1 and 2.
Figure 3B:
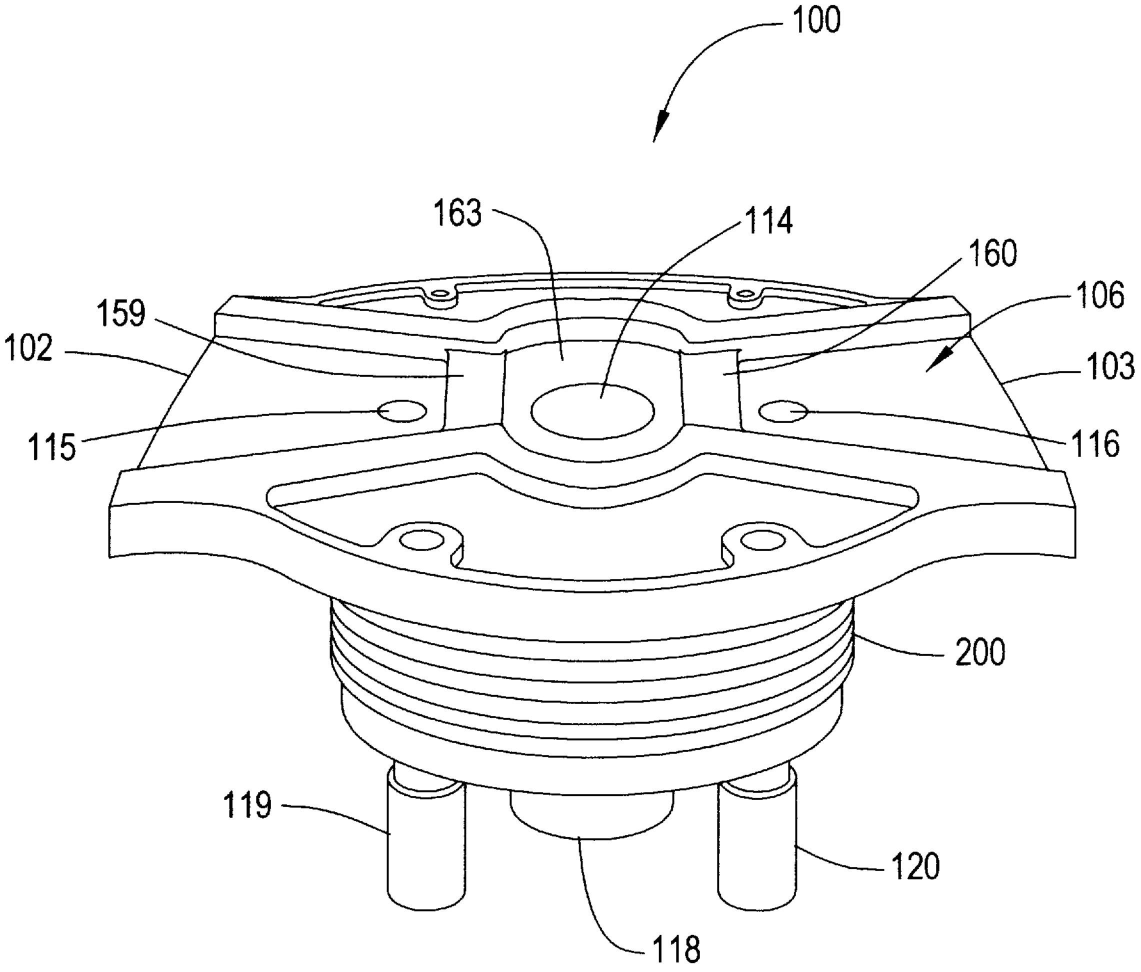
FIG. 3B is an isometric top, sectional, cutaway view of the hydrotherapy-tub coplanar-flow device of FIGS. 1,2 and 3A, with a top section removed for clarity.

Referring to FIGS. 1 and 2, for explanatory purposes, water is delivered from fluid supply conduit 118, through opening 114, and into hollow flow channel 106. Opening 114 leads to a single co: on interior flow channel 106, rather than multiple separate interior flow channels. Hollow flow channel 106 extends continuously from slotted nozzle 102 to slotted nozzle 103. Thus the slotted nozzles 102, 103 share a common interior flow channel 106. For water transmission, the fluid supply conduit 118 would be connected to or include a typical hose or tube leading from a (e.g., 13-14 p.s.i.) pump (not shown) housed within or nearby hydrotherapy tub 136. The pump would provide sufficient pressure for the formation of coplanar flow 131 (FIG. 3). For example, the pump may provide a water flow of 13 g.p.m. The pump typically would receive the water from within the tub and recirculate the same into the tub after pumping the water through one or more coplanar-flow devices 100. Furthermore, the user may advantageously adjust the pressure and/or amount of water delivered through fluid supply conduit 118, inlet 110, and flow channel 106. As will be understood by those skilled in the art, various devices may be used for flow adjustment and controls therefor may appear in various locations.

Air may be delivered from fluid supply conduits 119 and 120, through openings 115, 116 inlet 112, and into flow channel 108. In one example, the air is supplied below the water line yet vented or ducted from an opening to the atmosphere. As described herein, body 104 may be foiled so water from opening 114 and fluid supply conduit 118, is guided and/or directed by protuberance 159 to flow a separation distance over openings 115 and 116, and promote and/or enhance drawing of air into the openings 115, 116 from the air supply conduits 119, 120, respectively. This provides an efficient and/or effective system for delivering (e.g., hydrotherapeutically) desirable relative amounts of water and air to the substantially coplanar flow 131.

For transmission of the air in another example, fluid supply conduits 119, 120 would be connected to or include a typical hose or tube leading from the atmosphere or alternatively to a compressor or air pump (not shown) housed within or nearby the hydrotherapy tub. The compressor or air pump would contribute adequate pressure to provide desirable characteristics of the substantially coplanar flow. Ambient air vented from an outer surface of the hydrotherapy tub could be fed to the compressor or air pump. As with the water supply line described above, the air supply line desirably may allow the user to adjust the pressure and/or amount of air delivered through fluid supply conduits 119, 120, openings 119, 120 and flow channel 106. Clamps may be used to secure hoses to fluid supply conduits 118 and 120. Also, epoxy and/or glue may be employed.

By allowing the user to adjust the flow characteristics in one or more of the various fluid supply lines as desired in conjunction with the configuration of flow paths in body 104, the present invention advantageously permits the user to select mixtures and/or delivery rates of fluids such as air and water, for improved hydrotherapy through control over the coplanar fluid flow.

In accordance with the present invention, the hydrotherapy-tub coplanar-flow device may be mounted on the hydrotherapy tub in a variety of ways. FIG. 1 depicts the body of the coplanar-flow device largely embedded within the hydrotherapy tub wall. In this particular recess, the coplanar-flow device top is entirely covered by the tub inner surface. The nozzle peeks out from under this inner surface to desirably aim along relative direction approximately parallel to the inner surface.

Figure 7A:
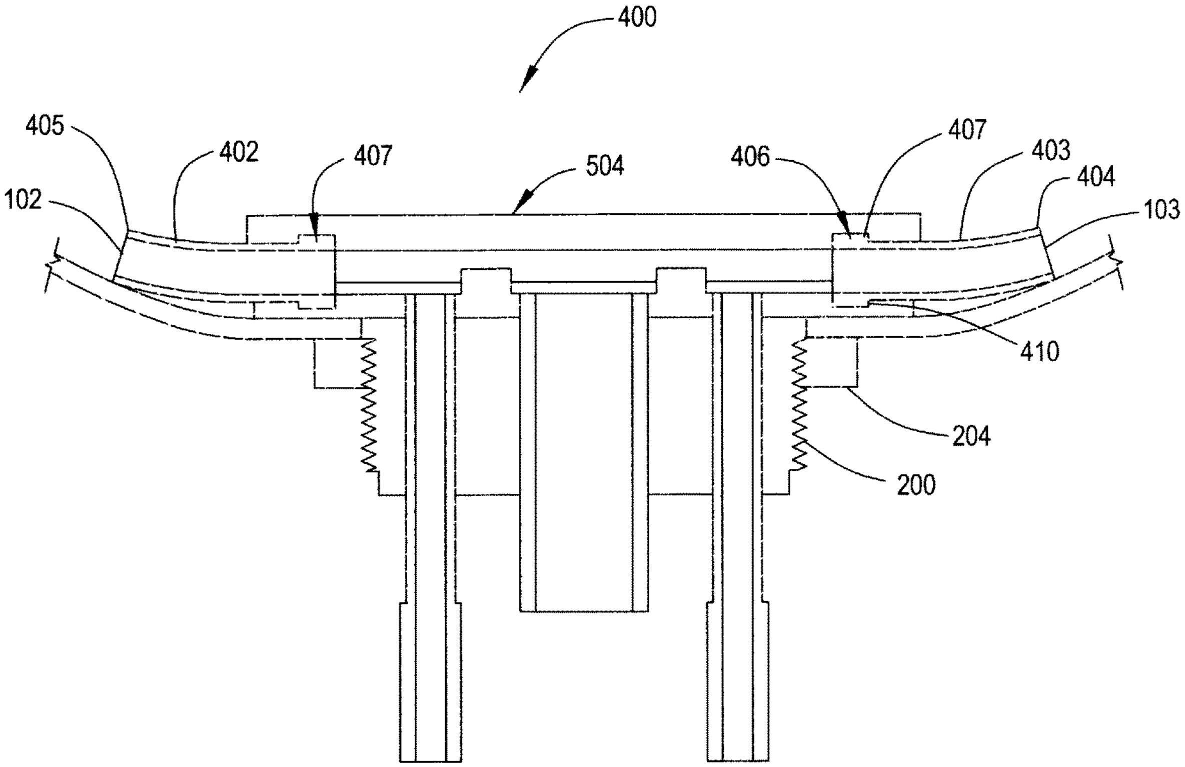
FIG. 7A is a side sectional view of a hydrotherapy coplanar flow device having resilient, flexible flow nozzles thereon.

Furthermore, coplanar-flow device 100 may include threaded cylinder 200 with exterior threads 202 for mating with nut 204 in order to securely position the device at local inner surface 134 of the tub 136. As shown in FIGS. 1 and 7A, nut 204 threads onto cylinder 200 to effectively clamp tub surface 134 between the body 104 of the coplanar-flow device 100 and the nut to create a water tight seal. Preferably, the length of the fluid supply conduits 118, 119, 120 are greater than the length of the threaded cylinder 200. Also, the length of air supply conduits 119, 120 may be longer than the length of water supply conduit 118. Also, the diameter of water supply conduit 118 may be larger than the diameters of air supply conduits 119, 120 to supply a larger volume of air. The diameters of the air supply conduits 119, 120 are generally equal to one another. The fluid supply conduits 118, 119, 120 extend from the body 104 of the device within the interior portion of the threaded cylinder 200 to a distance below the threaded cylinder 200. With such a configuration of the fluid supply conduits and threaded cylinder 200, as described, the ends of the fluid supply conduits are outside of the threaded cylinder 200 and readily accessible (without being within the cylinder) so that hoses can be readily clamped or otherwise affixed thereto to supply fluid, e.g., water and air, to fluid supply conduits 118, 119, 120, respectively. By having the fluid supply conduits within the center or interior portion of the cylinder 200, each device 104 may be mounted to the tub surface 134 using only one hole in the tub surface 134 where the threaded cylinder 200 and the fluid supply conduits all extend or are placed therethrough.

In one example, the device 100 is mounted to the inner surface 134 of hydrotherapy tub 136 also using epoxy or a similar water-tight sealant 144. The epoxy forms a fluid-tight seal that safeguards the contents of the hydrotherapy tub. In one preferred embodiment, the epoxy affixes body 104 in a position over chamber 146 that extends through part of the tub inner surface. The body, epoxy, and chamber cooperate to further provide a safe housing for the secure fastening of inlets 110 and 112 to respective fluid supply conduits 118 and 120. The body 104 may be affixed in a recess (not shown) of tub inner surface 134.

In one embodiment, the various components, layers, or parts of coplanar-flow device 100 are molded of ABS plastic. As one example, any number of parts of the coplanar-flow device may be injection-molded. For instance, any number of the parts of the coplanar-flow device may be unitary and/or integral.

Figure 6A:
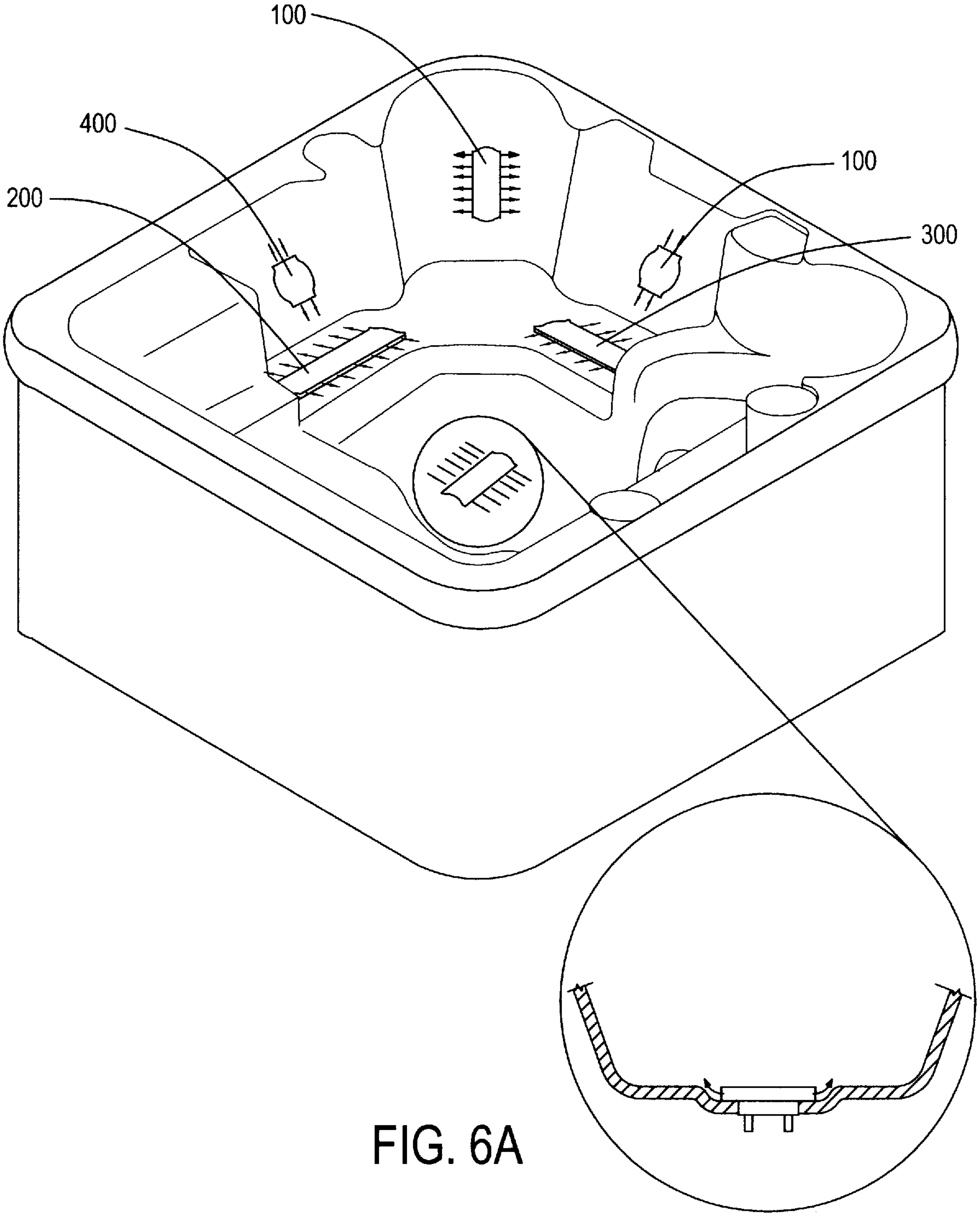
FIGS. 6A and 6B are isometric views of different hydrotherapy tubs having the coplanar flow devices of FIGS. 1-5B mounted thereon.
Figure 6B:
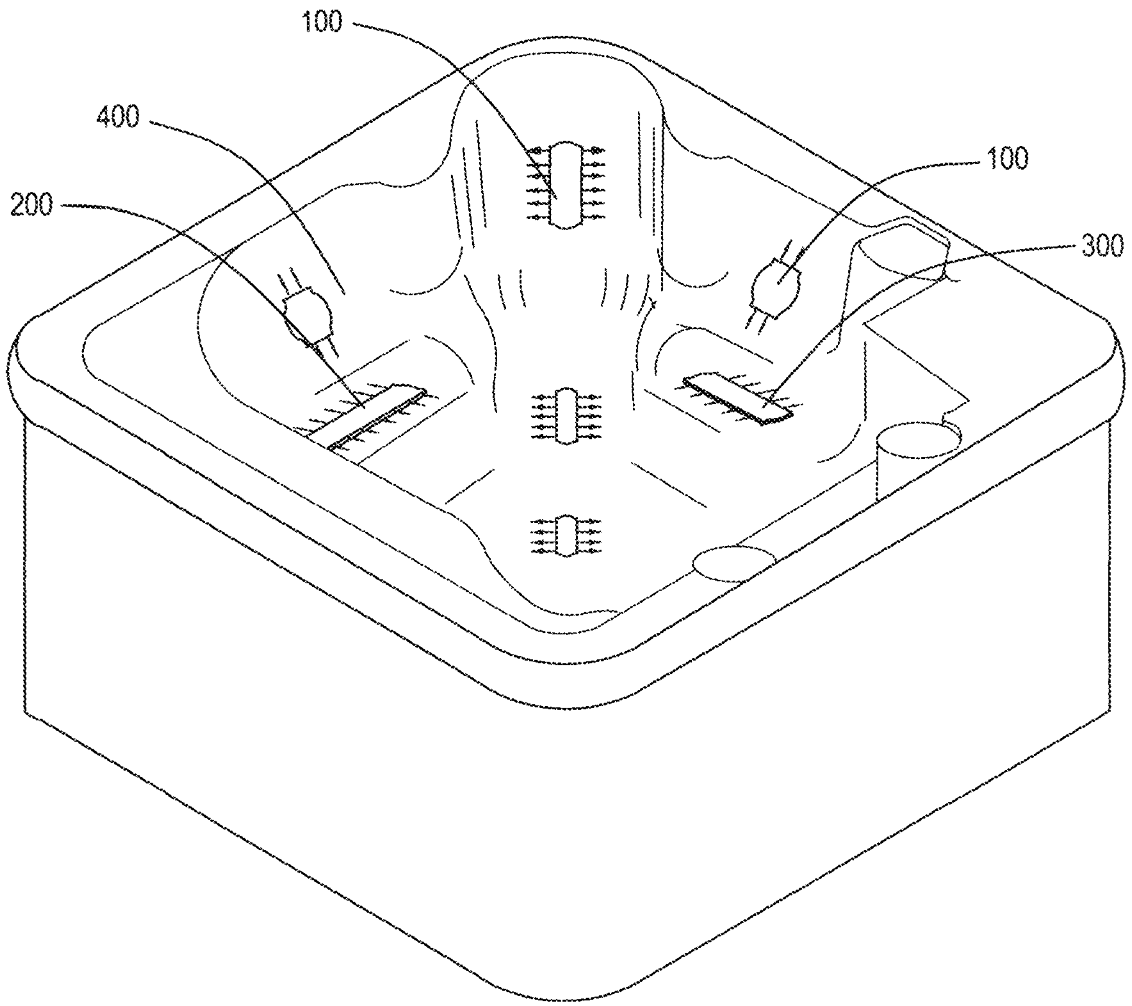

As depicted in FIGS. 6A and 6B, a hydrotherapy tub 136 may be equipped with multiple hydrotherapy-tub coplanar-flow devices (e.g. such as devices 100 and/or 200), in accordance with the present invention. As mentioned above, the slotted outlet or nozzles (FIG. 1) advantageously provides substantially coplanar flow 131 relative to the local inner surface 134. Moreover, the locations of the nozzles participate with local contours of the inner surface to deliver hydrotherapy to the user.

For instance, several of the coplanar-flow devices may be positioned in parallel in order to advantageously provide the coplanar flow 131 in the form of overall sheets of injected fluid. The tub contours already anticipate and promote desirable postures of users in seated and reclined positions. The coplanar-flow devices further promote hydrotherapy by extending the coplanar flow between the tub inner surface 134 and along the outer skin of the user for massaging.

For example, the coplanar-flow devices may advantageously deliver the hydrotherapy coplanar flow 131 between the shoulder blades and down along the back of a user. Also, the coplanar-flow may be directed upward from the feet and ankles and along the calves of a user. Additionally, one may direct the coplanar-flow along the buttocks and hamstrings. Naturally, the coplanar flow will ride along and hug around the exposed skin surfaces of the user. This is fully intended and enhanced, to massage greater extents of key body regions of the user by directing the coplanar flow along the inner surface 134 of tub 136, in accordance with the present invention.

As will be understood by those skilled in the art, benefits result from the positioning of flow channel 106 adjacent to flow channel 108 in device 100 (FIG. 1). Added benefits result from the presence of protuberance 159 in device 100, as discussed above. Also, the hydrotherapy-tub coplanar-flow device 100 may improve hydrotherapy flow at various locations within the hydrotherapy tub 136.

Figure 4A:
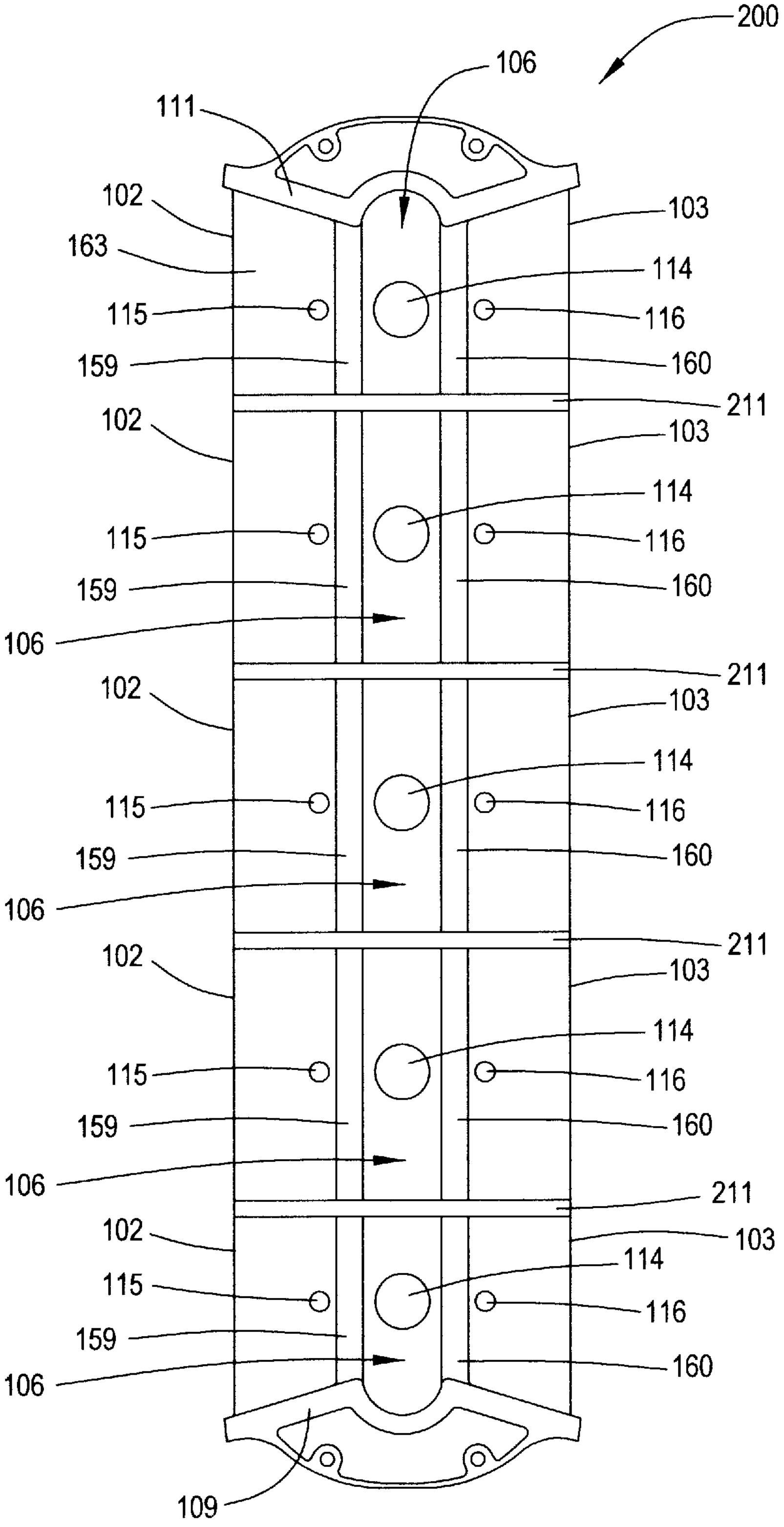
FIG. 4A is a top, sectional cutaway view of yet another example of a hydrotherapy-tub coplanar-low device producing substantially coplanar flow in accordance with the principles of the present invention, with a top section removed for clarity.
Figure 4B:
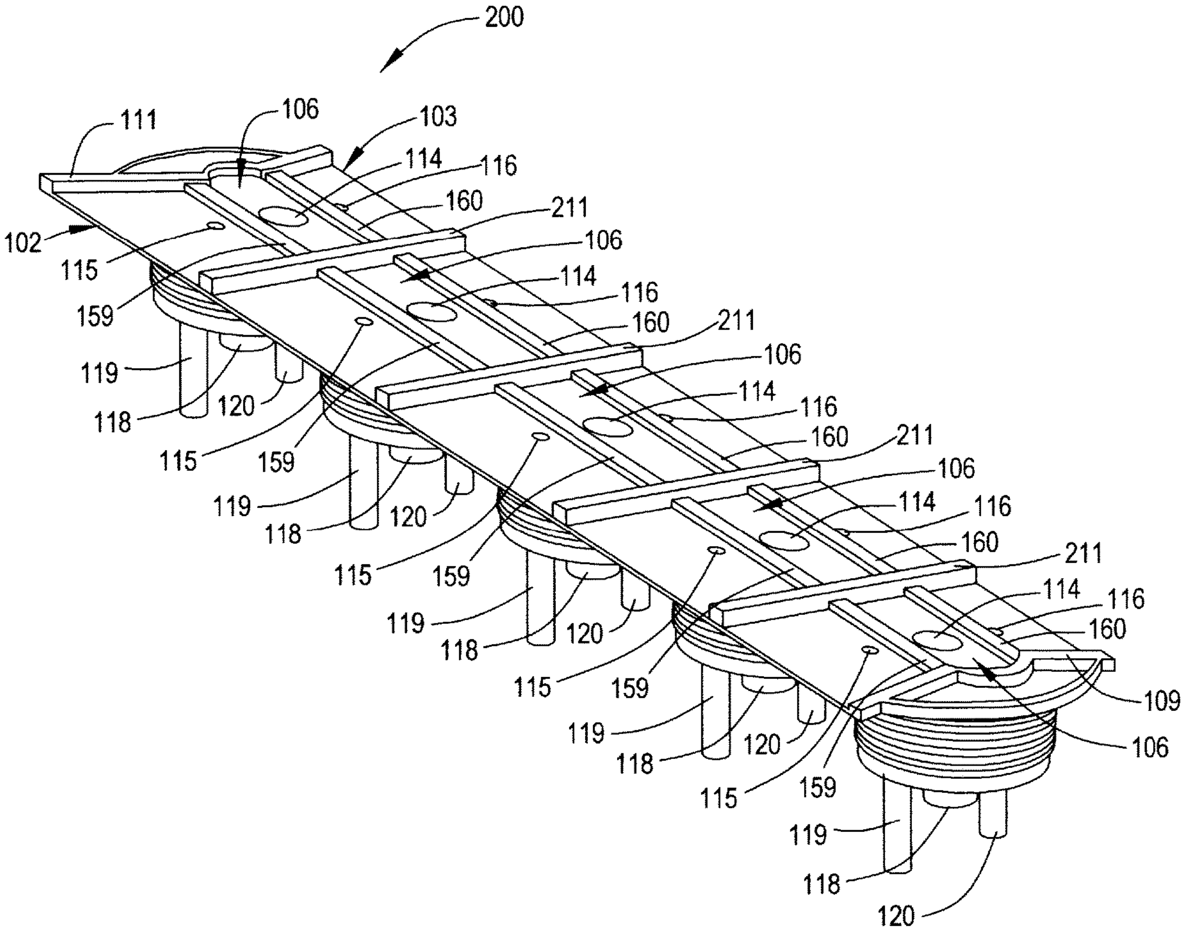
FIG. 4B is an isometric, sectional, cutaway view of the coplanar flow device of FIG. 4A, with a top section removed for clarity.

Referring now to FIGS. 4A and 4B, an alternative embodiment of a coplanar flow device 200 depicted in accordance with the principles of the present invention is shown. In this device 200, a plurality of oppositely facing coplanar flow nozzles 102, 103 are shown. The coplanar flow device 200 has multiple oppositely faced coplanar flow nozzles 102, 103. Each set of opposingly faced coplanar flow nozzles 102, 103 includes an opposingly oriented air supply openings 115, 116 leading to air supply conduits 119, 120. Each air supply conduit 115, 116 is between a protuberance or air dam 159, 160 and a slotted nozzle 102, 103. In addition, each opposing set of protuberances 159, 160 and air nozzles 119, 120 within the device 200 has a water supply opening 114 leading to an air supply conduit 118 located therebetween. Each set of oppositely faced coplanar flow nozzles 102, 103 is separated by a dividing wall 211, which extends from the bottom surface 163 of the hollow channel 106 to a top (removed for clarity) of the body 104. The top section (removed) contacts the side walls 109, 111, 211 to create water tight flow channels 106 so that fluid within a flow channel 106 does not leak onto an adjacent flow channel 106. Essentially, the device as shown in FIG. 4A-4B, is constructed as a body having individual sets of flow nozzles similar to those shown in FIGS. 1-3 placed side-by-side with one another into an integral housing. The geometry of the individual structures such as the conduits, protuberances, sides, and other structural elements in the device 200 are similar or identical to those similar corresponding structures depicted in FIGS. 1-3. Thus, the device shown in FIG. 4A-4B is, other than the specific differences discussed herein, identical to the device shown in FIGS. 1-3. Accordingly, the flow characteristics from each set of coplanar flow nozzles 102, 103 of the device 200 are similar to the flow characteristics of the device shown in FIGS. 1-3.

Figure 5A:
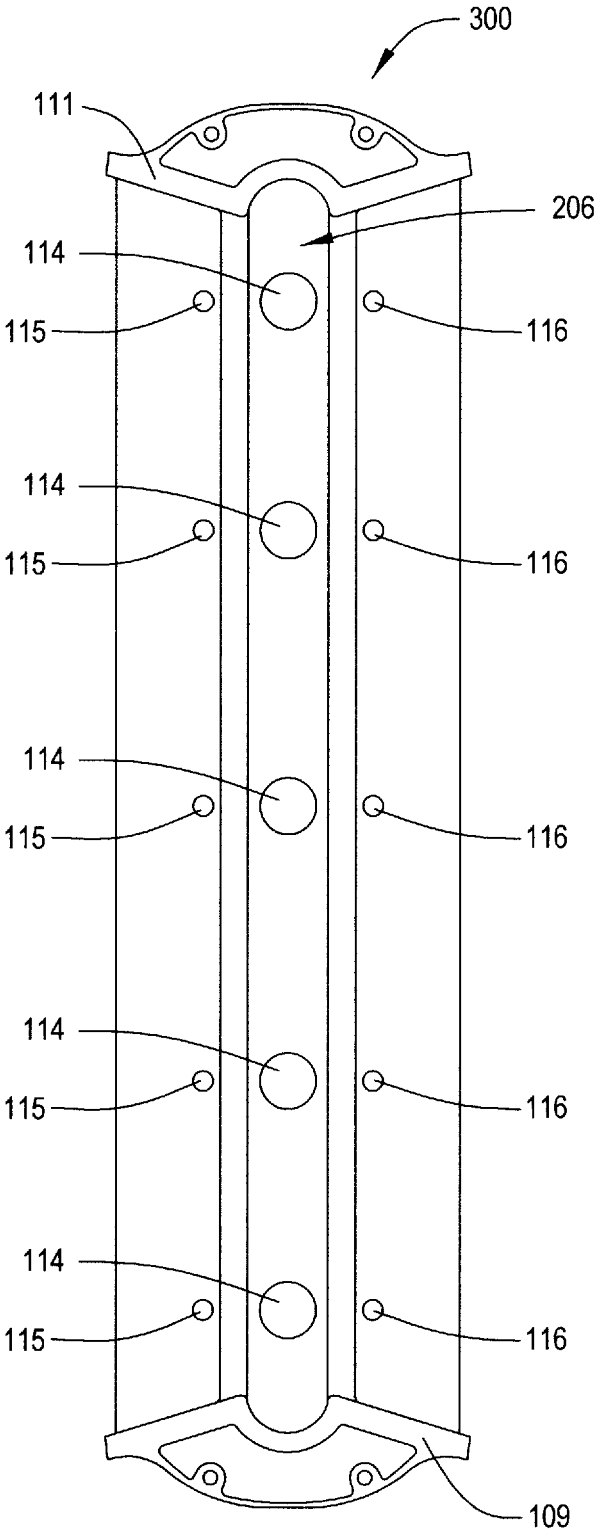
FIG. 5A is a top sectional cutaway view of yet another example of a hydrotherapy-tub coplanar-low device producing substantially coplanar flow in accordance with the principles of the present invention, with a top section removed for clarity.
Figure 5B:
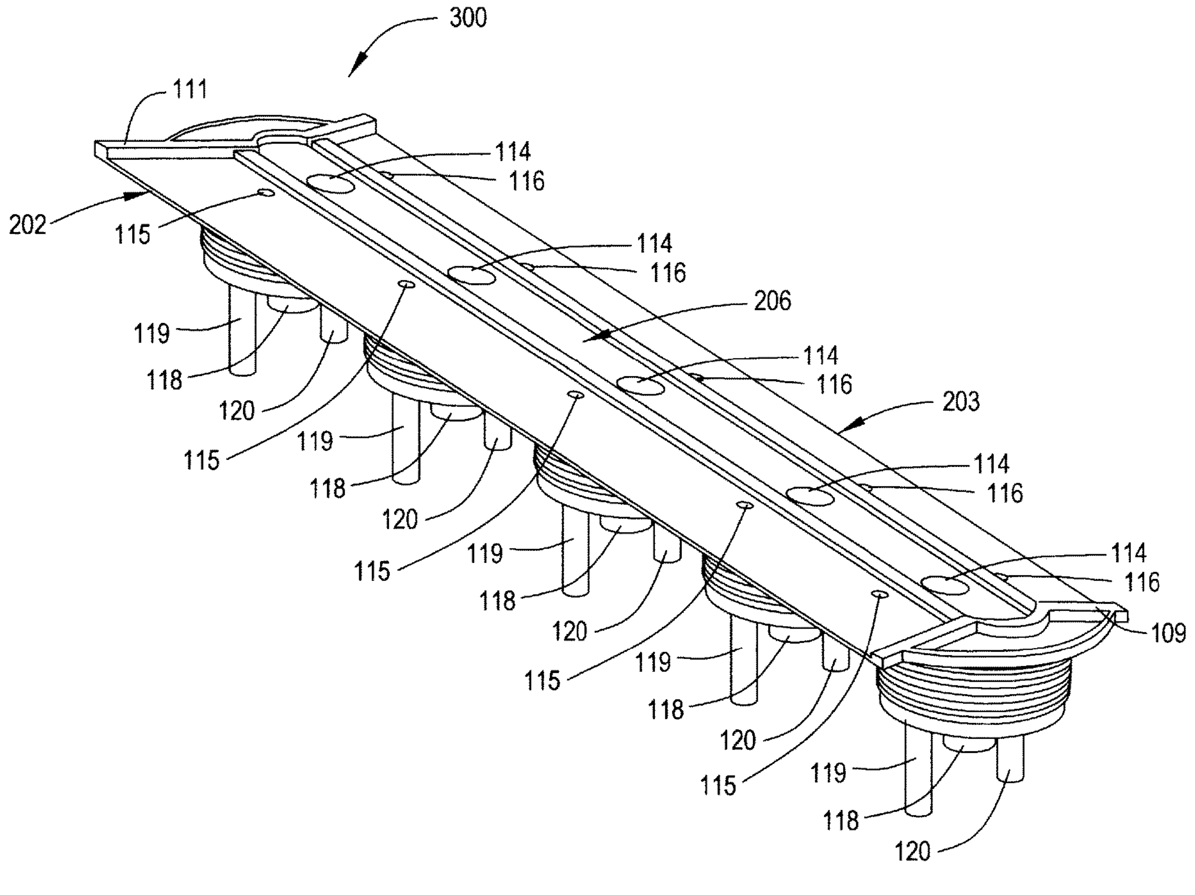
FIG. 5B is an isometric, sectional, cutaway view of the coplanar flow device of FIG. 5A.

In an alternative embodiment of the coplanar flow device 300, shown in FIGS. 5A and 5B, the interior side walls 211 (shown in FIGS. 4A-4B) have been removed. In addition, like in FIG. 4A-4B, the top section of the device is not shown for clarity. However, it should be understood that the device shown in FIGS. 4A-4B and 5A-5B, will include a top section covering the entire device. Otherwise, the device shown in FIGS. 5A-5B is identical to the device shown in FIGS. 4A-4B. Accordingly, a single central flow channel 206 is located within the device 300. This flow channel 206 is in fluid communication with all openings 114, 115, 116 so that water may flow from any water inlet 118 towards either slotted nozzle 202, 203 within and along the substantially entire length of the device. Accordingly, within this device, a hollow interior channel 206 extends from a first end of the device 300 towards a second end of the device as well as between individual sets of opposing coplanar flow nozzles.

In other embodiments, the number of water supply inlets within the device allowing water to flow into the hollow interior cavity 106 can be reduced to a number less than shown in FIGS. 4A and 5A. For example, in a coplanar flow device with, for example, five sets of fluid coplanar flow nozzles as shown in FIG. 4A, or with a single set of elongate flow nozzles as in FIG. 5A, less than five air supply inlets may be used (e.g., between one and five). For example, one or two air supply conduits may be used corresponding to one or two openings within the central channel for water to flow therethrough. In such situations, the ratio of flow areas could be similar to those described herein. However, the ratio of total water flow area from all water flow openings into the central cavity over the flow area above all of the dams, should be approximately 1.7 or higher, as described previously herein. As shown in the [new drawings] a coplanar flow device in accordance with the invention may be placed in various locations within a hydrotherapy tub. For example, an elongated coplanar flow device as shown in FIGS. 4A-4B, and/or 5A-5B may be oriented in the foot well of the tub, oriented vertically along a back rest of the tub, oriented horizontally on a seat of the tub, and/or oriented on the leg rest of the tub as shown in FIGS. 6A and 6B. When the device is located so that its length extends vertically along a back rest, a device will sit behind the back of a person whose back rests on the back rest. With this orientation, coplanar flow from the device will extend horizontally from the nozzles behind a person's back so that a therapeutic flow of froth will extend in opposite directions from the middle of a person's back towards the opposite sides of a person. In addition, when the device is placed on the seat of a hydrotherapy tub as shown in FIG. 6A-6B, an elongated device as shown in FIGS. 4A-4B and 5A-5B may be oriented on the seat of a tub so that the nozzles flow towards the rear of a person and towards the front of a person. In this manner, a person may sit on top of the device and a hydrotherapeutic flow of froth will flow from the device through the front and rear nozzles. Flow from the front nozzles will extend along the bottom of a person's body towards the person's legs and flow from the rear nozzles will flow along the rear of a person towards a person's rear side.

In addition, when the device is similar to that shown in FIGS. 4A-4B and 5A-5B is placed on the foot well of a hydrotherapy tub as shown in FIGS. 6A and 6B, the flow of fluid may extend in opposite coplanar directions under the feet of person's whose feet are located on the top of the device. When located in the foot well, the device may be either raised from the surface of the foot well, similar to as shown in FIG. 1, or the device may be recessed within the foot well so that the surface of the tub surrounding the nozzle is level to the top surface of the nozzle as shown in FIG. 6A. In addition, as shown in FIG. 6B, the devices similar to that shown in FIGS. 4A-4B and 5A-5B, may be oriented on the back and leg rest of a lounge-type seat as shown in the corner of the hydrotherapy tub of FIG. 6B. The orientation will correspond to a location where when a person lies on the lounge seat, the devices extends lengthwise substantially parallel to a person's legs. For example, a device may be oriented so that a person's legs sit on each side of the device, substantially parallel thereto, so that the flow from a first set of nozzles of the device flows along the surface towards a first leg of the person, and the flow from the opposite nozzles of the device flow in the opposite direction towards the second leg a person. In this manner, both legs of a person may receive a hydrotherapy flow of froth from a single nozzle so that the, for example, calves of a person lying on the lounge-type seat will be massaged. In addition as shown in FIG. 6B, a coplanar flow device may be located on the foot well of the hydrotherapy tub where each feet of a person sitting on the lounge seat may be located parallel to the device with the device located such that it is between and substantially parallel to the person's feet. In this manner both feet of a person sitting on the lounge seat may be massaged.

Figure 7B:
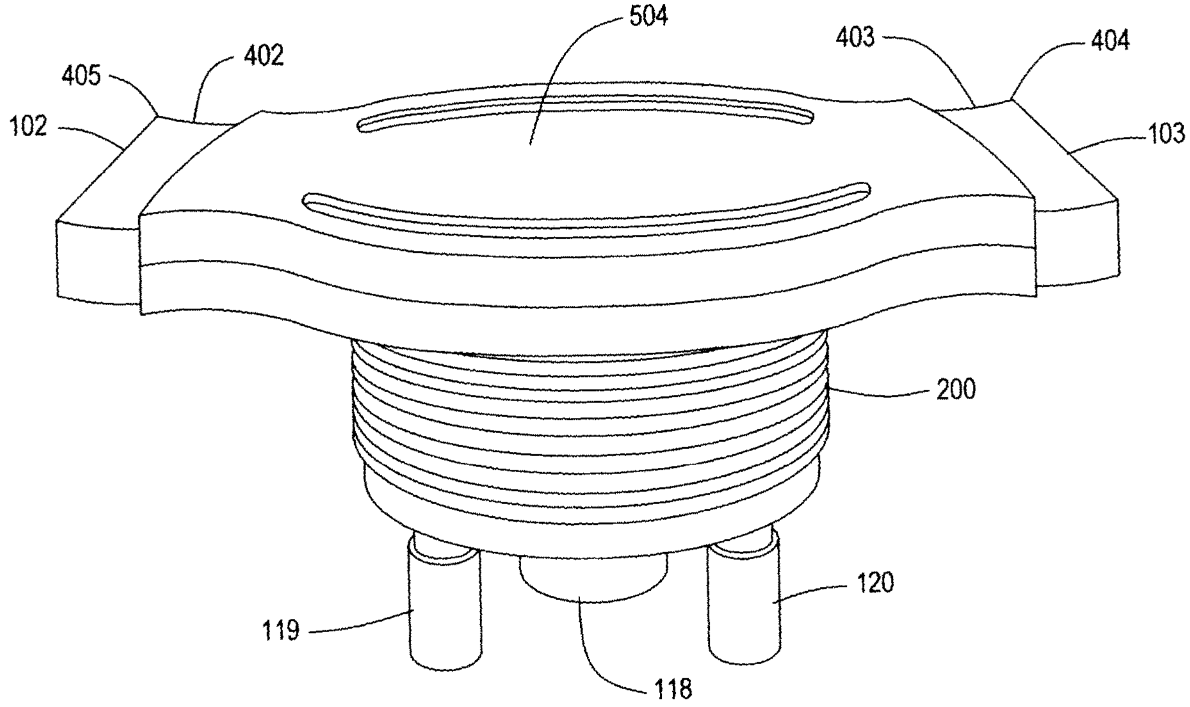
FIG. 7B is an isometric view of the hydrotherapy coplanar flow device of FIG. 7A.

Referring now to FIGS. 7A and 7B, a coplanar flow 400 device may be constructed so that the slotted nozzles 102, 103 are formed from a resilient and flexible material, for example, silicone or rubber. The resilient flexible material allows for the device to be mounted on surfaces with curvatures thereon and to conform to the surface of the hydrotherapy tub. For example, the device may be mounted in an area of a seat on a hydrotherapy tub where the backrest portion of the seats contacts the more horizontal portion of the seat, so that one horizontal nozzle can be curved upwards towards the back of the seat while the opposite slotted nozzle may be curved in a direction towards the more horizontal portion of the seat. In use of such curved slotted nozzles may allow the coplanar flow device as shown in FIG. 7, to provide coplanar flow on the surface of the hydrotherapy tub towards a seated person's back along with coplanar flow in the opposite direction towards a seated person's legs.

Referring still to FIGS. 7A and 7B, the resilient flexible material forming the slotted nozzles 102, 103 may be formed separately from the body 504, for example, as inserts 402, 403 of the coplanar flow device. Various techniques for securing the resilient flexible material inserts 402, 403 to the body may be used or implemented. For example, the resilient flexible material or inserts 402, 403 may include a first end 404, 405 which is narrower than the opposite end 406, 407 where the slotted nozzle is formed. The first end may be insertable into an opening within the body of the device. Moreover, the first end may contain a pair of oppositely faced protrusions 409, 410 which fit within recesses of the body to affix the first end within the body. However, other techniques for securing the flexible material into the body 504 of the hydrotherapy device to form slotted nozzles to allow the device to conform to the surface of the hydrotherapy tub while still obtaining coplanar flow through oppositely faced nozzles, may be used. Other than the resilient flexible inserts 402, 403 (as described above) and the recesses in the body 504 used to secure the inserts 402, 403 to the body 504 (also as described above), the structure and operation of the device is identical to the embodiment described in FIGS. 1-3.

While part(s) of the description herein, for explanatory purposes, may imply certain exemplary direction(s), such direction(s) may be considered relative. For example, a "decline" of protuberance 159 may be provided relative to a local structure, yet present little or no "descending" component in a larger context. In another example, such a "decline" of the protuberance 159 may indeed correspond to an "absolute descent". Design choice(s) allow accommodation(s) of any orientation(s) for any device(s) in accordance with the principles of the present invention.

Numerous alternative embodiments of the present invention exist. For instance, threaded interconnections could easily mount body 104 on inner surface 134, fasten inlets 110, 112 to fluid supply conduits 118, 120, or interconnect any upper and lower plates of body 104. Further, the fluids could easily be liquid or gas. Moreover, each fluid could easily include a group of fluids. Also, more than two fluids could easily be merged into substantially coplanar flow 131. For example, channels 106, 108 could easily take on any variety of interrelationships, ranging from maximal to minimal fluid intermixing or other combination. Additionally, any number of the devices (e.g., device 100") could easily be secured by mechanisms such as sidewalls 200 with mating threads 202 and nut 204. Furthermore, device 100 could easily be fixed in any desired direction relative to a given incline of the inner surface 134.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A hydrotherapy tub coplanar flow device comprising:

a body adapted for mounting on an inner surface of a hydrotherapy tub;

a hollow internal channel within said body extending continually from a first slotted nozzle at a first end of said body to a second slotted nozzle at a second end of said body, said first slotted nozzle and said second slotted nozzle being coplanar with a portion of said internal channel;

a first fluid supply conduit connected to said body and defining a singular flow path that is in fluid communication with said internal channel via directly intersecting an opening in a portion of said internal channel of said body to direct a singular flow of water from said first fluid supply conduit through said opening and into a first portion of the internal channel leading from a first side of the opening to the first slotted nozzle and into a second portion of the internal channel leading from a second side of the opening to the second slotted nozzle, wherein the internal channel extends directly across the entire opening between the first side of the opening at the first portion of the internal channel and the second side of the opening at the second portion of the internal channel without interruption;

a second fluid supply conduit located between said first slotted nozzle and said first fluid supply conduit to allow air to flow into said internal channel between said first slotted nozzle and said first fluid supply conduit;

a first interior dam located within said internal channel between said first fluid supply conduit and said second fluid supply conduit, said first interior dam forming a reduced cross sectional flow area for water in said interior channel relative to a flow area of water through the first inlet;

a third fluid supply conduit located between said first fluid supply conduit and said second slotted nozzle to allow air to flow into said internal channel between said second slotted nozzle and said first fluid supply conduit; and a second interior dam located within said internal channel between said first fluid supply conduit and said third fluid supply conduit, said second interior dam forming a reduced cross sectional flow area for water in said interior channel relative to a flow area of water through said first inlet.

2. The device of claim 1 wherein the device is configured to be mounted onto a surface of a hydrotherapy tub to produce first and second coplanar flow streams from said first slotted nozzle and said second slotted nozzle, respectively, said coplanar flow streams being coplanar on one or more surfaces of said hydrotherapy tub.

3. The device of claim 2 wherein a height of a slot of said first slotted nozzle or second slotted nozzle is similar to a height of said hollow internal channel.

4. The device of claim 3 wherein said first and second slotted nozzles face in opposite coplanar directions.

5. The device of claim 3 wherein said first and second slotted nozzles face away from each other at an angle less than 180°.

6. The device of claim 3 wherein said first or second slotted nozzle is curved relative to said hollow internal channel.

7. The device of claim 6 wherein said first or second slotted nozzle is formed of a flexible material capable of conforming to a shape of the surface of the hydrotherapy tub.

8. The device of claim 1, wherein said first interior dam and second interior dam are configured to cause water from said first fluid supply conduit to flow over said second fluid supply conduit and said third fluid supply conduit to draw said air from said second fluid supply conduit and said third fluid supply conduit to create a water and air froth which exits said first slotted nozzle and said second slotted nozzle.

9. The device of claim 1, wherein said first interior dam comprise a steep decline toward an opening between said second fluid supply conduit and said hollow interior channel.

10. The device of claim 1, wherein said dam comprises at least one abrupt step.

11. A hydrotherapy tub comprising:

a body mounted for mounting on an inner surface of a hydrotherapy tub;

the body comprising a hollow internal channel within said body extending exclusively along a first portion comprising a first slotted nozzle at a first end of the internal channel, a second portion comprising a second slotted nozzle at a second end of the internal channel, and an intermediate portion that extends between the first and second portions and comprises an opening, wherein the intermediate portion comprises an unobstructed open area of the internal channel that extends fully between the first and second portions and across the opening, and wherein said first slotted nozzle and said second slotted nozzle are coplanar with a third portion of said internal channel;

a first fluid supply conduit connected to said body and in fluid communication with said opening configured to direct a single flow path of water from said first fluid supply conduit through said opening directly into said intermediate portion of said internal channel where the water is allowed to flow into said first and second portions of said internal channel and through both said first slotted nozzle and said second slotted nozzle;

a second fluid supply conduit located between said first slotted nozzle and said first fluid supply conduit to allow air to flow into said internal channel between said first slotted nozzle and said first fluid supply conduit;

a first interior dam located within said internal channel between said first fluid supply conduit and said second fluid supply conduit, said first interior dam forming a reduced cross sectional flow area for water in said interior channel relative to a flow area of water through the first inlet;

a third fluid supply conduit located between said first fluid supply conduit and said second slotted nozzle to allow air to flow into said internal channel between said second slotted nozzle and said first fluid supply conduit; and a second interior dam located within said internal channel between said first fluid supply conduit and said third fluid supply conduit, said second interior dam forming a reduced cross sectional flow area for water in said interior channel relative to a flow area of water through said first inlet.

12. The tub of claim 11 wherein the device is configured to be mounted onto a surface of a hydrotherapy tub to produce first and second coplanar flow streams from said first slotted nozzle and said second slotted nozzle, respectively, said coplanar flow streams being coplanar on one or more surfaces of said hydrotherapy tub.

13. The tub of claim 12 wherein a height of a slot of said first slotted nozzle or second slotted nozzle is similar to a height of said hollow internal channel.

14. The tub of claim 13 wherein said first and second slotted nozzles face in opposite coplanar directions.

15. The tub of claim 13 wherein said first and second slotted nozzles face away from each other at an angle less than 180°.

16. The tub of claim 13 wherein said first or second slotted nozzle is curved relative to said hollow internal channel.

17. The tub of claim 16 wherein said first or second slotted nozzle is formed of a flexible material capable of conforming to a shape of the surface of the hydrotherapy tub.

18. The tub of claim 11, wherein said first interior dam and second interior dam are configured to cause water from said first fluid supply conduit to flow over said second fluid supply conduit and said third fluid supply conduit to draw said air from said second fluid supply conduit and said third fluid supply conduit to create a water and air froth which exits said first slotted nozzle and said second slotted nozzle.

19. The tub of claim 11, wherein said first interior dam comprise a steep decline toward an opening between said second fluid supply conduit and said hollow interior channel.

20. The tub of claim 11, wherein said dam comprises at least one abrupt step.

21. The tub of claim 11, wherein the intermediate portion of the internal channel extends linearly fully between the first and second portions of the internal channel and across the opening.

22. The tub of claim 11, wherein the third portion of said internal channel is defined by a portion of the first portion of the internal channel, a second portion of the first portion of the internal channel, and a portion of the intermediate portion of the internal channel.

23. The device of claim 1, wherein the internal channel extends directly across the entire opening between the first portion of the internal channel and the second portion of the internal channel.

24. The device of claim 1, wherein the internal channel extends directly linearly across the entire opening between the first side of the opening at the first portion of the internal channel and the second side of the opening at the second portion of the internal channel without interruption.

* * * * *